United States Patent [19]

Karcher, Jr. et al.

[11] Patent Number: 4,616,592

[45] Date of Patent: Oct. 14, 1986

[54] RECEIVING BELT BLOWBACK ARRANGEMENT

[75] Inventors: Ralph E. Karcher, Jr., Magnolia; Blandford W. Greene, Manchester, both of Mass.

[73] Assignee: USM Corporation, Farmington, Conn.

[21] Appl. No.: 614,059

[22] Filed: May 25, 1984

[51] Int. Cl.$^4$ ............................................. B05C 1/02
[52] U.S. Cl. ................................... 118/202; 118/247; 118/257
[58] Field of Search ................. 118/202, 59, 244, 203, 118/69, 247, 248, 257; 198/811

[56] References Cited

U.S. PATENT DOCUMENTS

| | | | |
|---|---|---|---|
| 852,861 | 5/1907 | Webber | 118/203 |
| 4,178,094 | 12/1979 | Silverberg | 198/811 X |
| 4,480,581 | 11/1984 | Simmonds, Jr. et al. | 118/50 |

Primary Examiner—John P. McIntosh
Attorney, Agent, or Firm—Spencer T. Smith

[57] ABSTRACT

A powder reinforcing machine for the manufacture of stiffening or reinforcing articles applyable to shoe uppers or articles of clothing or the like, for reinforcing, stiffening or even decorating thereof. The machine utilizes an annular rotating belt supported over an arcuate array of heater segments, once the powder has been deposited on the belt by deposition means. The belt is intermittently advanced over the heating segments to sequentially fuse the powder thereon. The belt is drawn onto the heater segments by a vacuum system disposed within the heater segments, once the belt has stopped rotating. The belt is released from the heater segment surface by an air blast from the same conduits used by the vacuum system, once belt rotation is to begin again.

4 Claims, 3 Drawing Figures

RECEIVING BELT BLOWBACK ARRANGEMENT

BACKGROUND OF THE INVENTION

(1) Field of the Invention

This invention relates to deposition machinery useful for applying reinforcing stiffening powder to a substrate, and more particularly to receiving belt loosening means on a shoe machine adaptable for manufacturing reinforcing shoe components.

(2) Summary of the Prior Art

The shoe and apparel industry have for many years been applying stiffening and reinforcing means to their shoe uppers, blue jeans, pajamas, sports clothing, and visors of caps and the like.

U.S. Pat. No. 4,480,581 to Simmonds et al and assigned to the present assignee, shows a machine for applying powdered material to a substrate, wherein a powder deposition station having a stencil assembly applies powder onto an annular receiving belt, the powder being applied in a three-dimensional configuration because of peripheral spacer means arranged on the cut-out between the stencil and the receiving belt. The annular receiving belt surface is empowered to rotate to an arcuate heating station where the powder is fused by heating elements arranged thereabove and therebelow. The fused powder is then moved to a join and cool station where a substrate such as a shoe upper or a portion of a garment is first received in a fixed bracket on a transfer means at the join and cool station, and thereafter rotated and pressed against the fused powder by the transfer means causing it to press against a chill plate therebeneath. The substrate is then lifted by the transfer means from the receiving surface after it has been cooled, the transfer means with the fixed holding bracket holding the now reinforced substrate, rotating so as to remove the substrate from the receiving surface, to enable the transfer means to present the substrate at its initial location for unloading from the fixed holding bracket on the transfer means, to permit a subsequent substrate to be manipulated therewith.

The arcuate heating station comprises an array of heating segments, as shown in the aforementioned patent application. Each heating segment has a plurality of orificii attached to a vacuum line, to pull the belt onto the segments for more efficient heating. The vacuum is shut off during rotation of the receiving belt, and is turned on again during dwell thereof at a new position. Unfortunately, there is a residual suction that pulls on the belt after the vacuum is shut off and as the belt is stepwise rotated over the heater segments towards the join and cool station. This puts a strain on the belt and on the gearing mechanism rotatively empowering the receiving belt.

It is an object of the present invention, to provide a means for releasing the belt from its closely held position to the heating segments just prior to its stepwise rotation, and to provide an air bearing so as to minimize wear on the belt during rotation, to reverse clean the orificii and permit smaller and more efficient drive means for empowering the receiving belt.

BRIEF SUMMARY OF THE INVENTION

The present invention comprises a pressurizable blowback arrangement adapted into the vacuum line of the heating segments of the powder reinforcing machine.

The blowback arrangement is timed to provide a positive charge of air through the vacuum system, to lift the receiving belt from the heating segments, just before the belt is caused to be rotated, by a blast of air jetted thereagainst.

The arrangement comprises a means for energizing an air pressure generator to utilize a vacuum system where the positive pressure alternates with the negative pressure or vacuum to raise a traveling belt from a surface, and hold it to the surface, respectively, during a heating operation.

A pair of switches are hand activatable to initiate rotary movement in a receiving belt, which is an annular surface, movably supported over an arcuate array of heating plates, horizontally disposed within the frame of a machine, as recited in U.S. Pat. No. 4,480,581. The switches actuate a control means such as an electromechanical relay which provides a signal to a solenoid valve, which controls the direction of air flow through a venturi device. The venturi is in fluid communication with the orificii disposed in the arcuate array of heating plates. The above-identified commonly assigned patent application recited a vacuum means that was adapted to be in fluid communication with the orificii in the heating plates. The present invention provides for a timed blast of pressurized air to be blown through those same (vacuum) orificii from a pressurized air source, the annular receiving belt being momentarily lifted by the jets of air from the arcuate heating surface of a powder reinforcing machine, breaking the vacuum therebetween, while providing an air bearing on which the annular receiving belt may rotate, providing a cleaning means for the orificii, and providing a minimization in the power requirements for rotating the annular receiving belt because of the reduced drag thereon during its intermittent rotation from station to station.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENT

Figure 1:
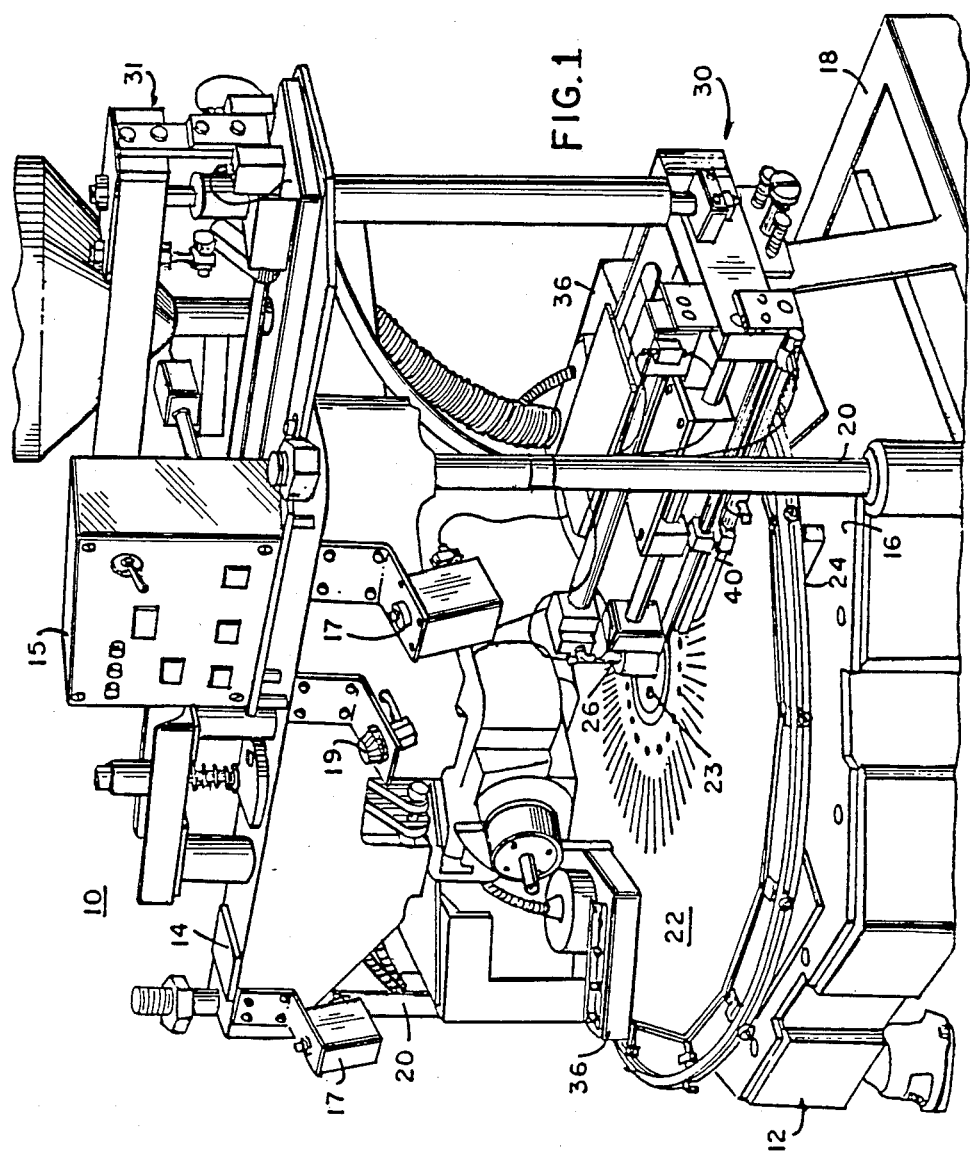
FIG. 1 is a perspective view of a powder reinforcing machine, having an annular receiving surface shown, other portions removed for clarity.

Referring to the drawings in detail, and particularly to FIG. 1, there is shown a reinforcement application machine 10, as described in commonly owned U.S. Pat. No. 4,480,581, and herein incorporated by reference. The machine 10 comprises a generally cylindrically arranged frame 12 having a horizontally disposed upper frame portion 14, and a horizontally disposed middle frame portion 16, supported on a frame base 18. The frame 12 includes a plurality of upright columns 20 securing the upper frame portion 14 to the middle frame portion 16. A control panel 15 is mounted on the upper frame portion 14, and a pair of start switches 17 and a reset switch 19 are attached to the front of the upper frame portion 14.

A circular receiving surface or rotary belt 22, having an outer support ring 24, is horizontally rotatable about a hub 23 through which a rotatably driven splined shaft 26 is arranged, the receiving surface 22 being arcuately advancable, counterclockwise in this embodiment, in a stepped intermittent manner through a plurality of arcuately spaced work stations, arranged beneath the upper frame portion 14 and on elements of the middle frame portion.

The first work station comprises a powder deposition station 30, shown most clearly in FIG. 1. The second work station comprises a heating station 32, consisting of a plurality of arcuately arranged lower heating elements 34 and upper heating units 36, shown in FIG. 2. The third station may comprise a load/press station 38, partially shown in FIGS. 1 and 2. The load station 38 may include chill means and press/transfer means, described below.

The circular receiving surface 22 is preferrably made from a web of woven glass fibers or from a thin woven stainless steel web, about 0.010 inches thick, covered on both sides by a smooth reinforced film of polytetrafluroethylene or the like, which permits release of any fused powder therefrom. The thin web of either receiving surface material permits rapid cycling from fusion heat to cold press because of its small thermal mass. The bottom side of the receiving surface 22 is in sliding contact with the arcuate array of lower heating elements 34 of the second work station.

The deposition station 30 as well as the remaining elements of the machine 10, and its operating characteristics may be reviewd in commonly assigned U.S. patent application Ser. No. 452,964 filed 12/29/82 now abandoned and U.S. Pat. No. 4,475,477 and incorporated herein by reference.

The heating station 32, which is located adjacent the deposition station 30, comprises the plurality of arcuate heater segments 34 arranged in an arc of about 240 degrees, on top of the middle frame portion 16. Each arcuate heater segment 34 has a plurality of orifficii 112 arranged therethrough, which are in fluid communication with an air pressure/vacuum system 500, shown in block diagram form in FIG. 3, which system is in addition to the heating elements therewithin.

The chill plate 120, disposed upon the middle frame portion 14 has refrigeration means in the form of cooling coils connected to a refrigeration unit, not shown, to chill the plate 120 to about 32°-100° F.

Figure 2:
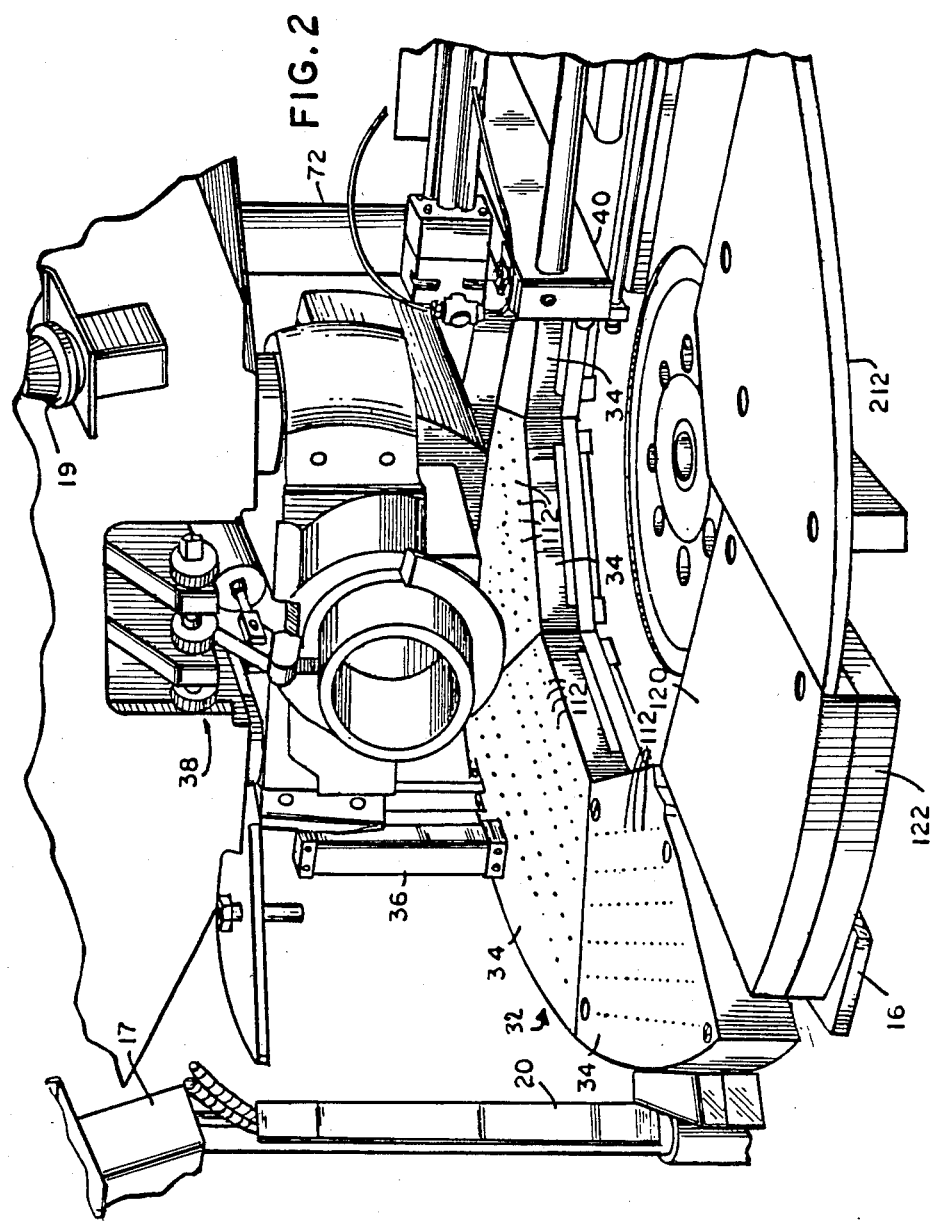
FIG. 2 is a partial perspective view of a powder reinforcing machine, showing its heating and chilling surfaces.

An arcuate stationary plate 212, shown in FIG. 2, is secured to the middle frame portion 16, contiguous to the chill plate 120 and the deposition station 30, thus completing the annular array of work stations arranged on the middle frame portion 16, and adjacent the locus of travel of the annular receiving surface 22 or belt, which rotates thereabove.

Figure 3:
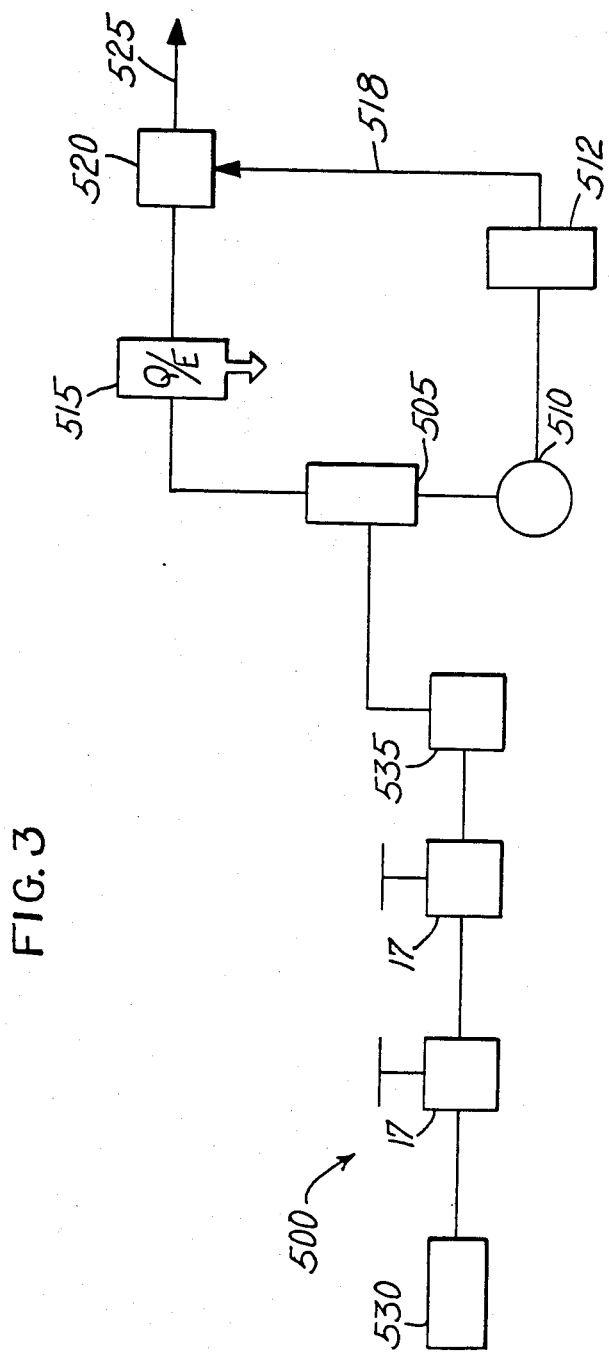
FIG. 3 is a block diagram of the supply and control mechanism for a blowback system of the powder reinforcing machine.

The combination air pressure/vacuum system 500, shown in FIG. 3, alternatively effectuates air at above atmospheric pressure and air below atmospheric pressure at the orificii 112 in the heater segments 34. The pressure/vacuum system 500 may comprise a switching means such as a three way solenoid valve 505 controlled by a proper electronic logic unit, not shown, which valve 505 is arranged to receive positive pressure air flow from a non-lubricated air source 510. An air blast quick exhaust valve 515 is in fluid communication with the solenoid valve 505. The exhaust valve 515 is in fluid communication with a vacuum generating means 520, such as a modified venturi mechanism such as that shown in U.S. Pat. No. 3,474,953. The vacuum generator means 520 is in fluid communication through an arrangement of conduits 525 with the orificii 112 in each of the arcuate heater segments 34.

The pressure/vacuum system 500 is actuated when a machine operator actuates the pair of control switches 17 and 17. This provides a proper signal to be sent from a power source, such as a 24VDC control voltage source 530 to initiate (through proper motor means) rotary motion in the carrier belt 22, and also, through the momentary actuation of a control device 535 such as an electromechanical relay which energizes the solenoid valve 505 to direct a timed positive flow of air through the air blast quick exhaust valve 515 and then through the vacuum generator 520 (opposite the direction of a normal flow path therethrough), and into the conduits 525 supplying the orificii 112 in the heater plate segments 34.

During the rotation of the belt 22, the blast of air from the orificii 112 therebeneath, provides an air bearing for the belt 22, while the belt 22 rotatively indexes itself arcuately upon the frame 16 of the machine 10. Once the indexed rotation of the belt 22 has ceased, the timed air blast from the orificii 112 is rapidly decayed by the shut-off and switching action of the solenoid 505. A vacuum is created in the orificii 112 by a positive flow of air from the non-lubricated air source 510, by transmittal via a further properly actuated three-way piloted valve 512 controlled by pneumatic logic, through a conduit 518 to the vacuum generator 520, causing the direction of air flow through the vacuum generator 520 (an air operated vacuum pump)to be reversed, sending a positive flow of air back into the quick exhaust valve 515, thus effectuating the vacuum in the conduits 525, to hold the belt 22 against the heater plate segment 34, facilitating heat transfer therethrough, to fuse any material carried thereon, until the belt 22 is caused to index again, whereupon the positive air blast will again be effected through the conduits 525 to release the belt 22 therefrom. The duration of the air blast and the vacuum is governed by energization of the solenoid 505 and valve 512.

It is noted that other means are available in the art to provide positive air flow in timed alteration with a negative air flow at the common conduits leading to the orificii 112 in the heating elements 34, such as reversible air pumps or the like which would be adaptable to the conduits 525, to effectuate the alternating holding and releasing of the belt 22 from the surface of the heating elements 34.

Thus, there has been shown unique means for improving the life cycle of the transfer belt, and its drive mechanism, while also minimizing the size necessary therefor, because of a positive air blast arrangement which utilizes a vacuum system symbiotically for efficiency and quality.

The common conduits which provide means for bringing a vacuum and a positive flow of air to a heating surface from a vacuum means and a pressurized air means in a powder reinforcing machine provides an economy and efficiency that show invention and advancement in the art.

We claim:

1. A powder deposition machine for fusing powdered material comprising:
   conveyor means including a conveyor belt,
   a first work station including means for depositing powdered material on said conveyor belt, a second work station including heater means for fusing material deposited on said conveyor belt, said heater means including surface means for supporting said conveyor belt, said surface means having a plurality of orifices, means for intermittently advancing said conveyor belt to advance deposited powdered material at said first station to said second station, means for supplying pressurized fluid to said orifices to be expelled from said surface means to define a fluid bearing between said surface means and said conveyor belt, means for creating a vacuum at said orifices whereby said conveyor belt will be forcefully brought into contact with said surface means, means for conjointly actuating said supplying means and deactuating said vacuum creating means when said conveyor belt is being advance, and means for conjointly actuating said vacuum creating means and deactuating said supply mean when said conveyor belt is not being advanced.

2. A powder deposition machine according to claim 1, wherein said supplying means and said vacuum creating means comprises a source of pressurized air, a vacuum generator and means for directing the pressurized air through said vacuum generator in a first direction.

3. A powder deposition machine according to claim 2, wherein said directing means comprises means for alternately directing the pressurized air through said vacuum generator in a second direction opposite to said first direction.

4. A powder deposition machine according to claim 3, wherein said conveyor belt is coated with polytetrafluroethylene or the like.

* * * * *